United States Patent [19]
Barthelmess

[11] Patent Number: 5,803,271
[45] Date of Patent: Sep. 8, 1998

[54] CENTRIFUGAL FORCE SEPARATOR

[75] Inventor: Ulrich Barthelmess, Niederstotzingen, Germany

[73] Assignee: Omya GmbH, Germany

[21] Appl. No.: 622,710

[22] Filed: Mar. 26, 1996

[30] Foreign Application Priority Data

Mar. 28, 1995 [DE] Germany .......................... 195 11 313.4

[51] Int. Cl.[6] .................................................. B04B 5/12
[52] U.S. Cl. .......................................... 209/713; 209/714
[58] Field of Search .................................... 209/714, 713, 209/142

[56] References Cited

U.S. PATENT DOCUMENTS

| | | | |
|---|---|---|---|
| 3,372,805 | 3/1968 | Lykken et al. | 209/714 X |
| 4,390,419 | 6/1983 | Barthelmess . | |
| 4,661,244 | 4/1987 | Hanke et al. | 209/714 X |
| 4,792,393 | 12/1988 | Blasczyk et al. . | |

FOREIGN PATENT DOCUMENTS

| | | |
|---|---|---|
| 1757582 | 3/1976 | Germany . |
| 2551175 | 5/1977 | Germany . |
| 2951819 | 9/1981 | Germany . |
| 3622413 | 1/1988 | Germany . |

*Primary Examiner*—David H. Bollinger
*Attorney, Agent, or Firm*—Londa and Traub LLP

[57] ABSTRACT

The invention relates to a centrifugal force separator whose rotor shaft protrudes at at least one of the two axial ends through a chamber for the discharge of the fines and the air. Particularly, the invention relates to the problem, in a centrifugal force separator with bilateral aspiration of fines and air, of reducing the distance between the bearings of the rotor shaft, while at the same time achieving an optimum between the requirement for unhampered outlet of the fines and the separating air, on the one hand, and, on the other hand, the requirement of a short distance between the bearings and, therefore, a short, light rotor shaft. According to the invention, each outlet chamber 17,18 provides an extension 19,20 or boss reaching inward axially, in which a bearing 21,22, for the rotor shaft is contained.

5 Claims, 5 Drawing Sheets

CENTRIFUGAL FORCE SEPARATOR

BACKGROUND OF THE INVENTION

The invention relates to a centrifugal force separator having a substantially cylindrical housing with a tangential separating-air inlet extending over the entire height of the separator rotor, and whose rotor shaft extends outwardly at both axial ends through an outlet for the fines and the air, the diameter of the outlet being substantially equal to the diameter of the rotor.

A centrifugal force separator of this kind has previously been disclosed in German Federal Patent 2,951,819. This separator is characterized by a high throughput, together with a high output of fines with little coarse material or wrong size material in the fines.

It is a disadvantage, however, that this kind of construction calls for a relatively long shaft, and thus a heavy one. The two fines/air outlet chambers are formed each by an elbow-shaped piece of pipe whose diameter corresponds approximately to that of the rotor. The rotor shaft passes through these curved outlet pipe sections, and it has to be sufficiently sealed against the pipe from the ambient atmosphere. On both sides of the seals a bearing for the shaft is provided. On the upper end of the shaft is a belt pulley or the like.

The rotor shaft as well as the separator rotor must be of compact and relatively massive construction due to the great axial distance between the bearings, in order to achieve the necessary strength and prevent vibration.

German Federal Patent 2,825,400 has already disclosed a centrifugal force separator whose rotor buckets are fastened at both ends to an end ring and the two end rings are mounted at their outer circumference in a hydrostatic, aerostatic or electromagnetic bearing. Such bearings, however, are rather expensive, especially due to the large diameter of the end rings.

SUMMARY OF THE INVENTION

The present invention is addressed to the problem, in a centrifugal force separator of the kind described above, of reducing the distance between the bearings of the rotor shaft, although the bearings are to be accessible from the outside for maintenance, measurement and repairs; at the same time an optimum is to be achieved between the requirement of an unhampered fines and discharge air outlet, the short distance between bearings, and accessibility.

The solution to this problem is that the inwardly reaching extension or boss for containing the bearing takes up relatively little space, so that the remaining cross section suffices for the unhampered outlet of the fines and discharge air.

At the point on the circumference where this outlet chamber, expanding like a snail shell, reaches its greatest inside diameter, i.e. after 360 degrees, or after one full turn from the start of the snail-shell-like or helicoidal formation, there follows a preferably tangential outlet conduit.

Aside from the aerodynamically efficient configuration of such a snail-shell discharge chamber, the result is that the bearing housed axially inwardly in the boss is easily accessible, or in any case in the relatively large circumferential area of the beginning or point of origin of the discharge shell or helix. Another result is a low axial height.

Since the rotor shaft becomes lighter and thinner with the shorter distance between the bearings, the space occupied by the bearings becomes reduced accordingly. The forces produced become lower in the same proportion, so that smaller cross sections or wall thicknesses can be used accordingly.

The distance between the bearings of the rotor shaft can be further reduced by causing the end rings with the radial arms connected to the rotor shaft to be inclined inwardly toward one another.

In particular, many different possibilities of configuration result. The separator rotor can be disposed horizontally or vertically.

If the separator rotor is disposed horizontally, the amount of the granules to be separated are most simply fed in together with the air, so the granules are already relatively fine, so that the coarser grains are also carried by the air stream. Underneath the separator rotor there is provided a large, funnel-shaped outlet chamber in which the air velocity drops sharply, so that the coarse granules drop down into the outlet funnel.

For coarser granules a vertical arrangement of the separator rotor would probably be more advisable. In this case, the mixture being separated can be delivered as usual from above into the separating chamber surrounding the rotor.

At the bottom end of the housing, a plurality of funnel-shaped coarse material outlets extending each over part of the circumference can lead into the separating chamber. Their bottom surfaces can be provided with a hard, wear-resistant and at the same time smooth coating, e.g., a ceramic glaze. The smoother the surface is the less they need to slope, so that the axial height can be lower.

BRIEF DESCRIPTION OF THE DRAWINGS

For further explanation of the invention, examples of its embodiment will be described below.

DETAILED DESCRIPTION OF THE INVENTION

Figure 1:
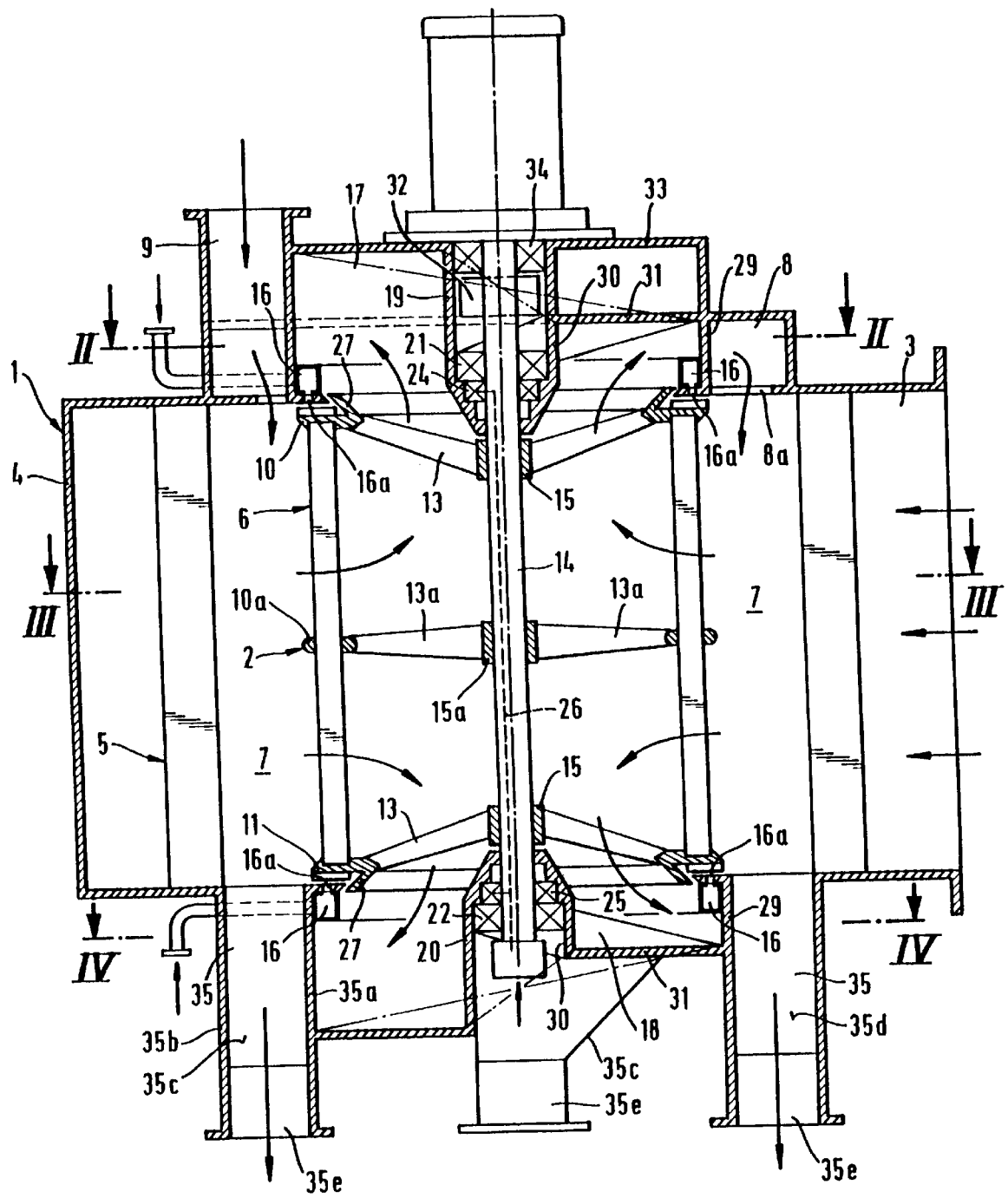
FIG. 1 shows a longitudinal section through a vertically disposed centrifugal force separator according to the invention.

The separator has a vertically disposed, substantially cylindrical housing 1 in which a separator rotor 2 can rotate. The separator rotor has a tangential air inlet 3 extending over the entire height. At a radial distance from the housing case 4, an entrance bucket wheel 5 is provided. Also at a radial distance from the driving bucket wheel the fan or bucket wheel 6 of the separator rotor is provided. The granules to be separated are fed downwardly into the cylindrical ring separating chamber 7 extending between the entrance bucket wheel and the fan wheel. Above the separating chamber there is provided an annular channel for blowing in the granular material, with an input connection 9.

The separating fans 6 are held fast between an upper and lower end ring 10 and 11; from the end rings extend substantially radial arms 13 toward hubs 15 affixed to the shaft 14 of the rotor 2. To stiffen the fan wheel 6 another, central ring 10a is provided, which also is connected fixedly by radial arms 13a and a hub 15a to the rotor shaft 14.

At each end of the separator rotor 2 there is a chamber 17, 18 for the discharge of fines and the air. The gap between the end rings 10 and 11 of the separator rotor 2 and the confronting annular housing wall is sealed such that no coarse particles can pass from separating chamber 7 into the fines chamber 17. For this purpose, an annular channel 16 is provided which has connection bores 16a distributed over the circumference.

According to the invention, both the upper and lower fines outlet chamber 17 and 18 have central bosses 19 and 20, in which bearings 21 and 22 for the rotor shaft 14 are inserted. The result is a very short distance, in comparison to the state of the art, between the two bearings 21 and 22 and hence a correspondingly short and light rotor shaft.

The radial arms 13 between the end rings 10 and 11 and the rotor shaft are inclined inwardly toward one another, so that the two radial bearings 21 and 22 can be set still further inwardly, that is, the rotor shaft becomes still shorter.

Each bearing 21 and 22 is sealed from the interior by an annular gap seal 24 and 25, to which flushing air is fed through axial and radial flushing air channels 26 in the shaft.

To correspond to the tapered bearing case, a conical ring 27 is provided by which the flow is guided and an additional sealing gap is formed.

The two fines outlet chambers 17 and 18 are of a helical or spiral configuration formed by cylindrical outer walls 29, cylindrical inner walls 30 and outwardly spiraling walls 31 that are circular in plan between them. The rotor shaft bearings 21 and 22 are contained in the inner cylindrical walls 30 and the above-mentioned bosses 19 and 20. In the circumferential area at which the outlet spiral begins the bearings are especially easily accessible from the side.

Figure 2:
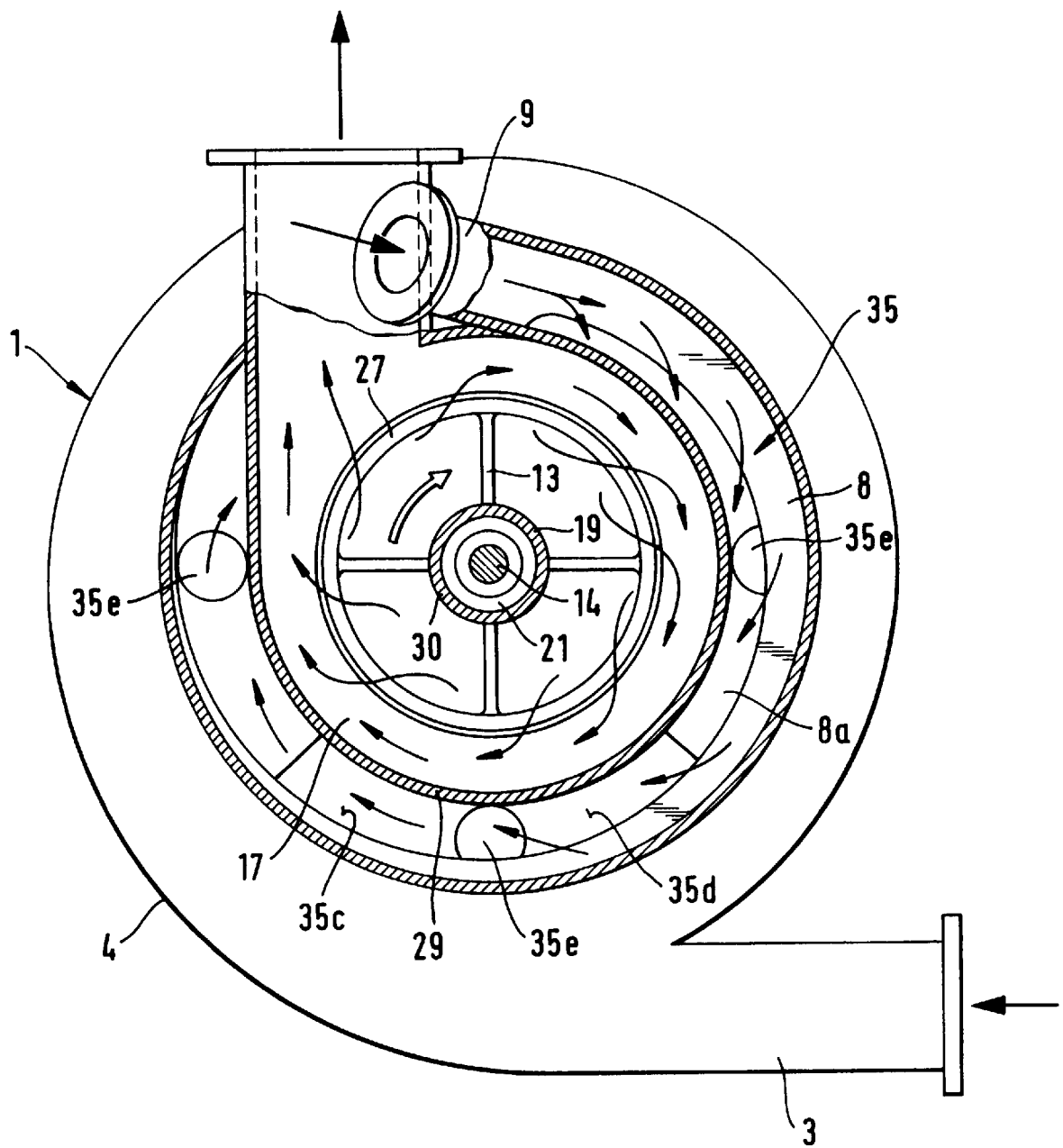
FIGS. 2, 3 and 4 show cross sections taken along the lines II—II, III—III, and IV—IV in FIG. 1.
Figure 3:
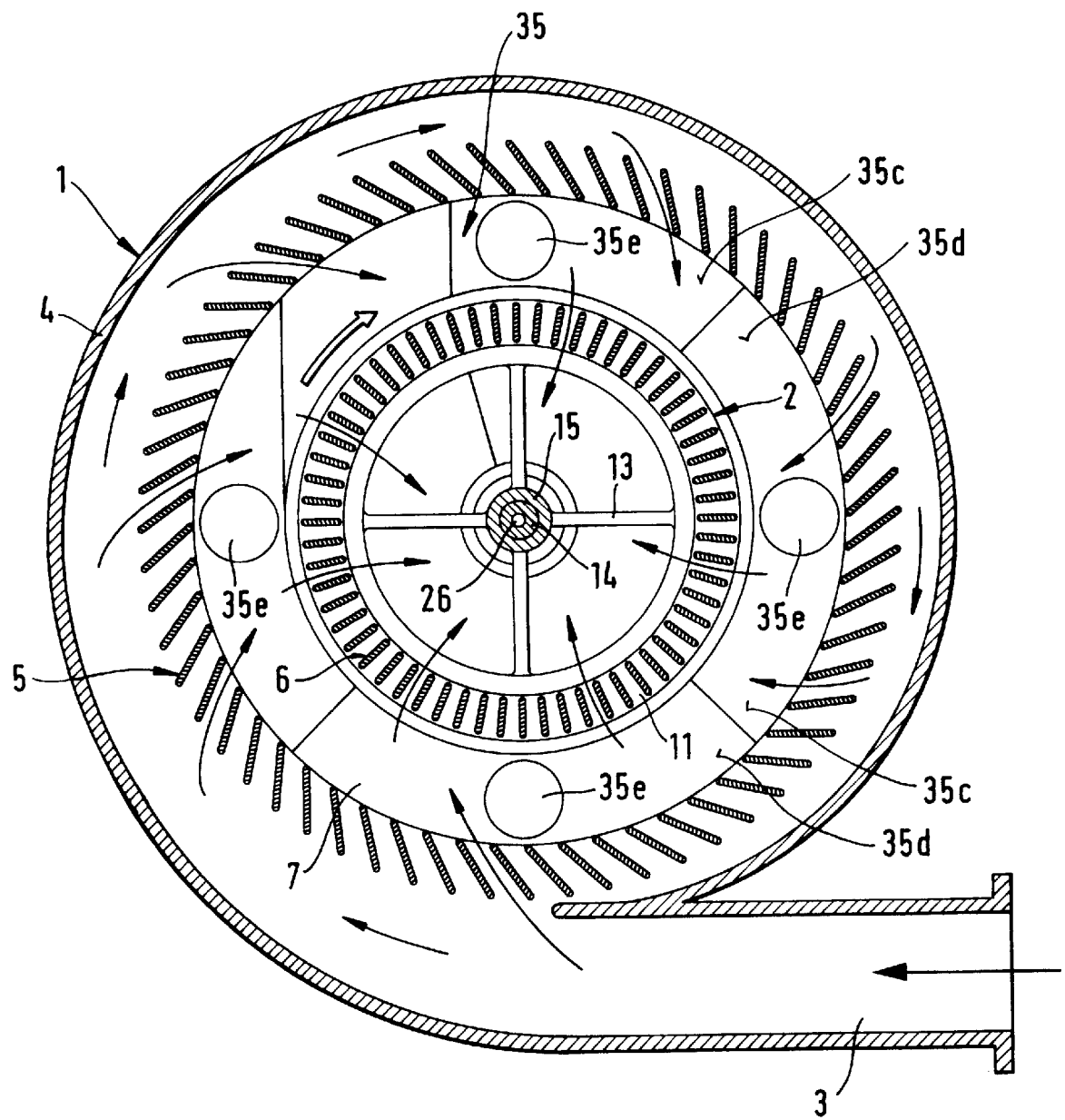
Figure 4:
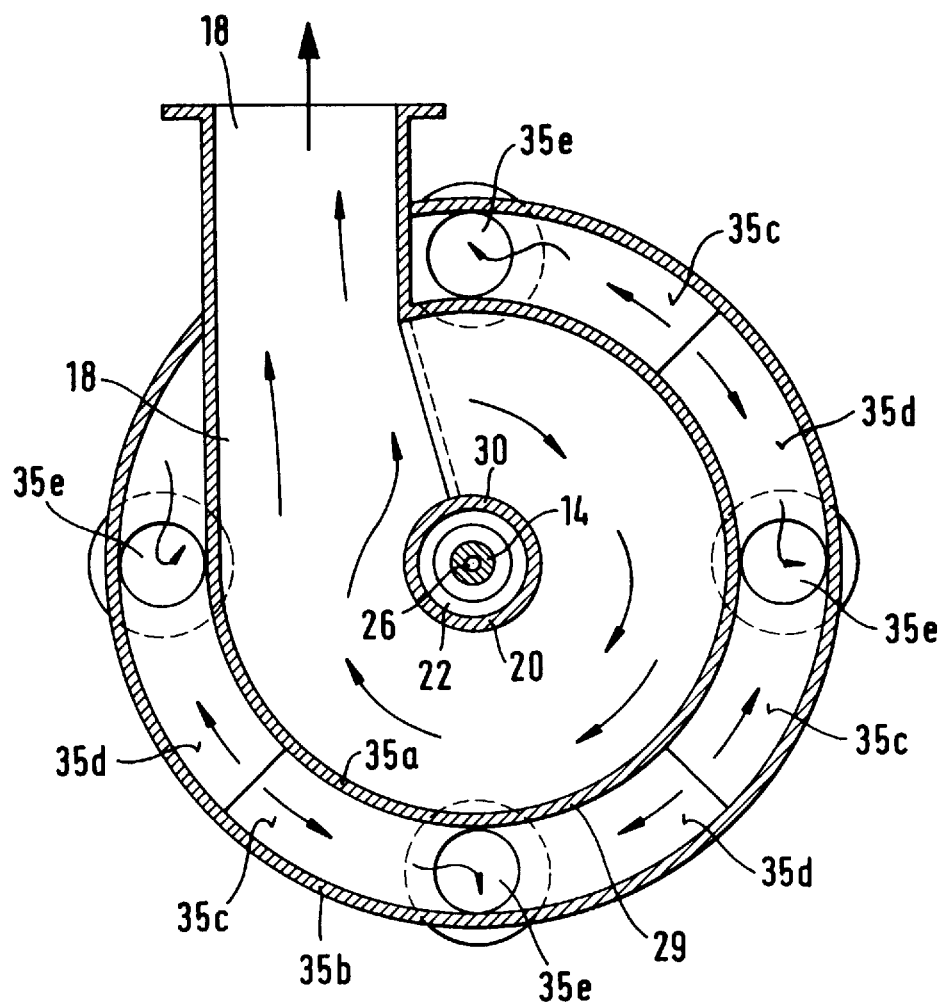
Figure 5:
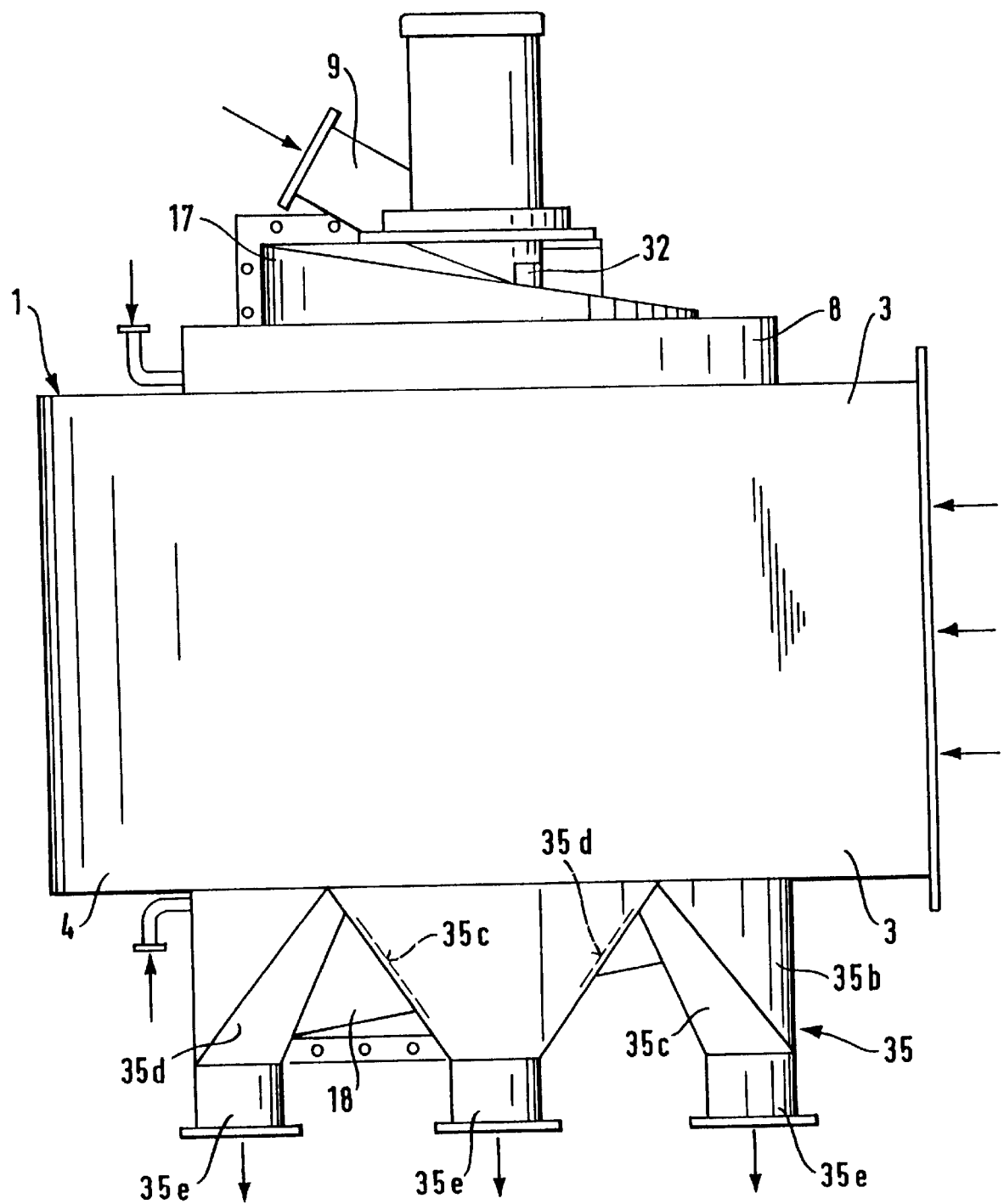
FIG. 5 is a side view of the separator.

At the top, radially outwardly, the annular mixture inlet passage 8 adjoins the outer cylindrical wall 29. In FIG. 2, the connection 9 is inclined and tangential to the annular passage 8. The underside of the annular passage is provided with a spiral-shaped section 8a that widens in the direction of flow, so that the material being separated is distributed uniformly over the circumference.

Above the upper outlet chamber 17 there is a ring-shaped plate 33 or platform on which the motor or transmission is mounted. At the upper end of the boss, an axial bearing 34 is provided, which bears the weight of the rotor.

With the drive arranged in this manner, the bearing 21 and the seal 24 are still accessible through a lateral window 32 in the boss 19; this window is provided below the platform 33 and above the bearing 21.

On the opposite end, i.e., the bottom end of the casing, four funnel-shaped coarse grain outlets 35 are provided, each extending over one-fourth of the circumference, and between them the bottom bearing 22 is easily accessible from the side.

Each of the four coarse grain outlets 35 thus consist of an inner and an outer, outwardly bulging vertical wall 35a, 35b and a radial wall 35c, 35d, each inclined toward an outlet connection 35e.

What is claimed is:

1. A centrifugal force separator comprising a separator rotor having a rotor shaft with at least two axial extremities and a bearing at each axial extremity, a substantially cylindrical housing having a tangential air inlet extending over the entire length of the separator rotor, wherein the rotor shaft extends outwardly at both axial extremities through the center of a first fines outlet chamber at one end of the rotor shaft and through the center of a second fines outlet chamber at the other end of the rotor shaft, said fines outlet chambers having diameters which are substantially equal to the diameter of the separator, and wherein both first and second fines air outlet chambers have central bosses extending inwardly in the axial direction, in which bearings for the rotor shaft are inserted, and wherein the fines outlet chambers surrounding the bearings widen helically or spirally outwardly in the axial direction.

2. The centrifugal force separator according to claim 1, further comprising radial arms provided on the rotor shaft in regions of the two axial extremities, said regions being located inwardly from the bearings at each axial extremity, wherein the radial arms connect end rings of the rotor to the rotor shaft and wherein the radial arms are inclined inwardly from each axial extremity toward one another, thereby reducing the distance between the radial arms and allowing the two bearings to be located closer to each other.

3. The centrifugal force separator according to claim 2, further comprising a plurality of coarse grain collecting and outlet chambers substantially wedge-shaped in side view, provided adjacent to a lower end of the housing, each chamber extending over a portion of the circumference of the separator.

4. The centrifugal force separator according to claim 3, further comprising an annular channel in each of the fines outlet chambers, provided for delivering air to a seal between the end ring and a housing wall opposite the end ring.

5. The centrifugal force separator according to claim 4, further comprising an underside of the annular channel for the admission of the material to be separated, and having a section or cutout which widens spirally in the direction of flow, for the uniform distribution of the material over the circumference of the separator.

* * * * *